United States Patent [19]

Suchowski et al.

[11] 3,929,102

[45] Dec. 30, 1975

[54] AQUARIUM AERATOR AND ORNAMENT HOLDER

[75] Inventors: Bernard Suchowski, Marlboro; David D. Lovitz, Short Hills; Claud W. Kissin, Fort Lee, all of N.J.

[73] Assignee: The Hartz Mountain Corporation, Harrison, N.J.

[22] Filed: Jan. 30, 1975

[21] Appl. No.: 545,426

[52] U.S. Cl. ................................................. 119/5
[51] Int. Cl.² ........................................ A01K 64/00
[58] Field of Search ........................................ 119/5

[56] References Cited
UNITED STATES PATENTS

| | | |
|---|---|---|
| 3,232,272 | 2/1966 | DeJose et al. ........................... 119/5 |
| 3,326,185 | 6/1967 | Perez ...................................... 119/5 |
| 3,548,786 | 12/1970 | Willinger ................................ 119/5 |

*Primary Examiner*—Hugh R. Chamblee
*Attorney, Agent, or Firm*—Posnack, Roberts & Cohen

[57] ABSTRACT

A combination aerator and ornament holder having support means for the stem of the holder and air holes in the roof of the device for creating streams of air bubbles directed upwardly along the ornament. A hollow body portion supports a pipefitting attachable to an outside air hose, the air flowing into the body portion up to the roof thereof which has two domelike portions containing clusters of said air holes flanking a central aperture through which the ornament stem is inserted. A base extends outwardly from the body portion and is adapted to receive thereover aquarium gravel.

5 Claims, 4 Drawing Figures

AQUARIUM AERATOR AND ORNAMENT HOLDER

BACKGROUND OF THE INVENTION

1. The Field of the Invention

This invention relates to aquarium aerators and ornament holders — more particularly to a combination unit serving both as the holder for the ornament stem and as an aerator creating bubbles in the region of the ornament.

2. The Known Art

Aerators for aquariums and ornament holders are in common use. They are, however, mostly separate devices each independently serving its intended purpose. The use of two separate units is thus costly and space-consuming. Moreover the known art does not disclose any arrangement of devices serving both of said functions, and where the aerating process is used in coactive relation to the ornament for creating a beautifying effect.

OBJECTIVES OF THIS INVENTION

It is the main object of this invention to provide a single unit that conveniently and effectively aerates aquarium water and supports an ornament in coactive relation to streams of air bubbles to produce an especially attractive effect. More specifically, the object of this invention is to provide a unitary device serving the following multiple functions: as a guide for facilitating the insertion of the stem of an ornament, as a holder for the stem, as an aquarium aerator, and as the creator of the attractive effect of streams of visible bubbles moving upwardly along the ornament. And it is a further object of this invention to provide an easily fabricated and relatively inexpensive device having the above-mentioned features.

Other objects, features and advantages will appear from the drawings and the description hereafter given.

SUMMARY OF THE INVENTION

The invention comprises a hollow body portion with an inner chamber defined by an annular wall, a roof with a central apertured portion communicating with a stem-support extending down from the roof into said chamber, the roof having a plurality of air holes therein. The said annular wall supports an outwardly extending pipe fitting adapted for receiving thereover an air hose connected to a suitable air pump. Extending outwardly from the bottom of said annular wall is a flat base with a recessed portion below and in clearing relation to said pipe fitting. In the preferred embodiment the roof has two domelike portions each containing a cluster of air holes, said domelike portions having opposed downwardly and inwardly inclined sections sloping toward said apertured portion and serving as guide walls for inserting the stem of an ornament. Said flat wall is adapted to underlie gravel for securing the device against displacement.

The arrangement is such that the device serves the multiple functions of a guide for inserting an ornament stem, a holder for the stem, an aquarium aerator and the creator of the attractive effect of streams of bubbles moving upwardly along the ornament.

DESCRIPTION OF PREFERRED EMBODIMENT

Figure 1:
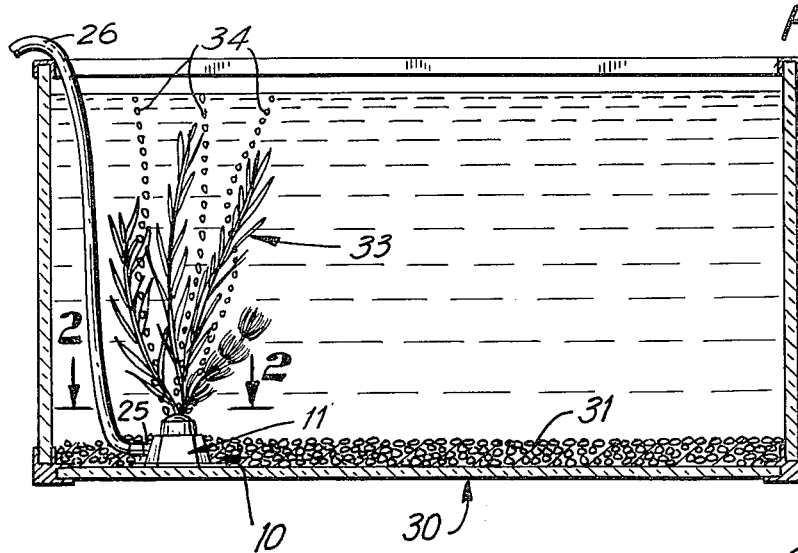
FIG. 1 is a vertical cross-section of an aquarium with the device of this invention, shown in elevation, operatively disposed therein, an air hose being shown connected to the device.
Figure 2:
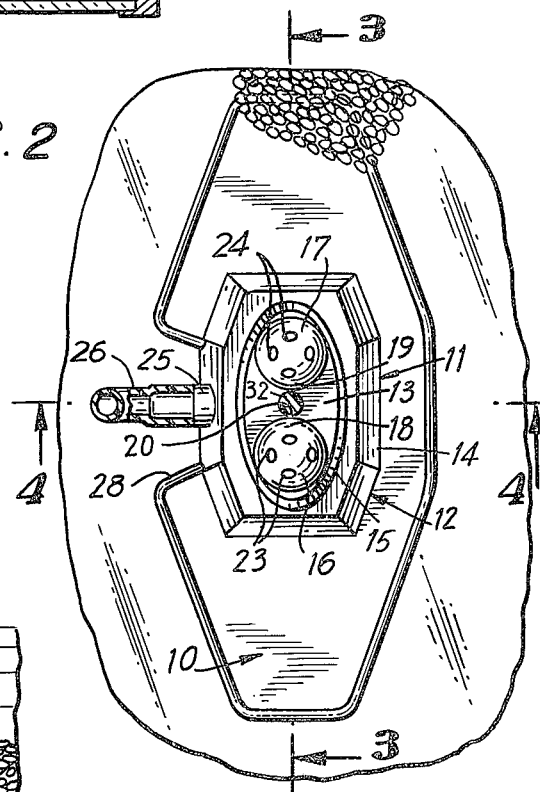
FIG. 2 is a fragmentary plan view of the device of FIG. 1.
Figure 3:
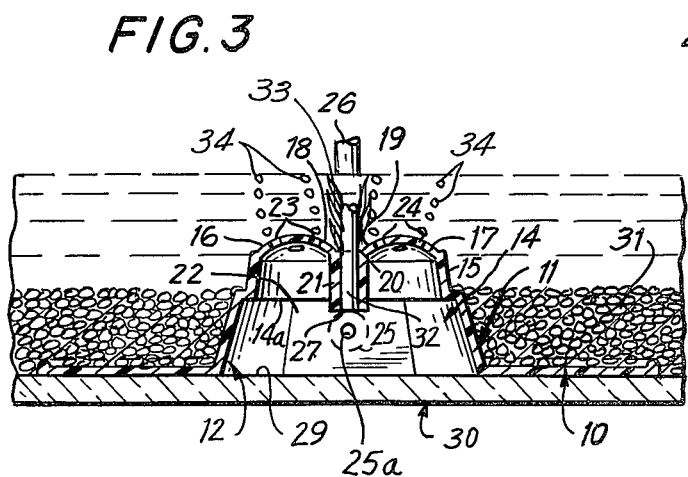
FIG. 3 is a fragmentary section of FIG. 2 taken along line 3—3.
Figure 4:
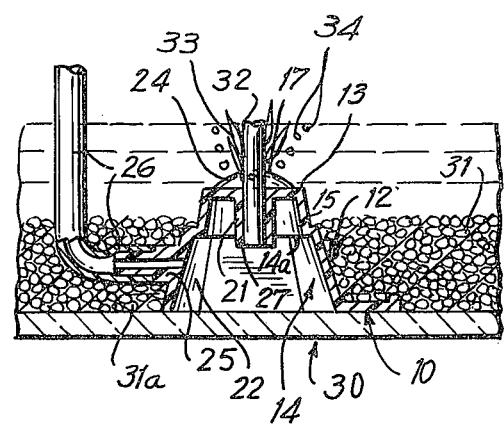
FIG. 4 is a fragmentary section of FIG. 2 taken along line 4—4.

The invention in the form thereof illustrated in the drawings comprises a flat base generally designated 10 and a hollow body portion, generally designated 11, extending upwardly therefrom and being laterally enclosed by the annular wall generally designated 12 and topped by a roof generally designated 13. In the particular embodiment shown in the drawings, said annular wall 12 comprises a lower portion 14 and an upper portion 15, said lower portion sloping upwardly and inwardly. Said roof 13 has laterally opposite convex domelike portions 16 and 17 the respective inner sections 18 and 19 thereof sloping downwardly and inwardly toward the central aperture 20 of said roof which communicates with the hollow cylindrical stem support 21 extending downwardly from said roof into the interior chamber 22 of said body portion 11.

Said domelike portions 16 and 17 of the roof have therein the respective clusters of holes 23 and 24, said clusters being in flanking relation to said aperture 20. It is preferred that said stem support 21 extend down partly into said chamber 22 to a level adjacent the top 14a of said lower wall portion 14. Extending outwardly from said lower wall portion is the hollow fitting 25 which communicated with said inner chamber 22 through opening 25a and is proportioned to receive thereover the hose 26 leading to a conventional aquarium air pump not shown. In the preferred construction illustrated, said opening 25a is positioned below the bottom terminal 27 of the stem support 21, and said base 10 has a recessed portion 28 below said fitting 25.

The arrangement is such that when the device is set upon the floor 29 of the aquarium 30, the gravel 31 will overlie the base to firmly maintain it in place. The said recessed portion 28 provides a space below said fitting 25 and the portion of the pipe 26 positioned thereover for an underlying layer of gravel 31a, said gravel being adapted to support the fitting-pipe assembly 25, 26. The said inner sections 18 and 19 of said domelike portions 16 and 17 are arranged in converging relation to provide a guiding path for the stem 32 of the ornament 33, in the manner hereinbelow described.

When said stem 32 is operatively inserted in place — by sliding it downwardly along the guiding surfaces of said inner sections 18 and 19 into said central aperture 20 and along the inside of the stem support 21 — it will be firmly held in place, the ornament 33 extending above the device within the body of the aquarium water.

In the operation of this device, air is pumped into pipe 26, through the fitting 25 and the hole 25a into the chamber 22; and since said stem support 21 and the stem 26 are above the said hole 25a, the air will flow in uninterruptedly. The pressure within the chamber 22 forces the air out through said holes 23 and 24 into the form of air bubbles 34. Since the clusters of air holes 23 and 24 are in the two domelike portions 16 and 17 of the roof 13, there will be upwardly moving streams of said bubbles flanking said ornament 33 as well as moving upwardly therethrough.

The arrangement is hence such that the device above described not only serves as aerating means for the aquarium water, but also as a support for an ornament and as means for creating attractive streams of upwardly moving bubbles around and through the ornament. The beautifying effectiveness of the ornament is thus greatly enhanced by the continuous stream of bubbles.

It is to be noted that the upward and inward inclination of the lower wall portion 14 will serve to direct the adjacent air upwardly and inwardly towards said domelike portions 16 and 17 containing said air holes 23 and 24, and that due to the convex configuration of the said domelike portions, the air bubbles from each dome will travel along divergent paths, whereby the observable scene is that of a spreading bubble stream.

In the above description, the invention has been disclosed merely by way of example and in preferred manner; but obviously many variations and modifications may be made therein. It is to be understood, therefore, that the invention is not limited to any particular form or manner of practicing same.

We claim:

1. A combination aquarium ornament stem holder and aerator comprising a hollow body portion having a base at the bottom thereof adapted to rest on the floor of an aquarium and a roof at the upper portion thereof, said roof having a plurality of air holes therein and an apertured stem-receiving portion, said body portion having a pipe fitting communicating with the interior thereof and adapted for connection to a source of air supply, whereby when air is operatively pumped through said pipe fitting it will enter the interior of said body portion and emerge as bubbles through said air holes adjacent said stem-receiving portion, thereby to flow upwardly in adjacent relation to an ornament operatively supported by said stem-receiving portion, said body portion having an annular wall defining an interior chamber, said stem-receiving portion comprising a hollow stem support extending down from said roof into said chamber, said stem-receiving portion being centrally disposed with respect to said roof and having an apertured portion communicating with said stem support, said air holes comprising a plurality of clusters of holes flanking said apertured portion, said roof having a plurality of domelike portions each containing a cluster of said air holes.

2. A combination aquarium ornament stem holder and aerator according to claim 1, there being two of said domelike portions in flanking relation to said apertured portion, said domelike portions having opposed downwardly and inwardly inclined sections sloping toward said apertured portion, whereby said sections constitute guide walls for inserting an ornament stem into said stem-receiving portion.

3. A combination aquarium ornament stem holder and aerator according to claim 1, said annular wall sloping upwardly and inwardly from said base toward said roof, whereby air operatively entering the said chamber will be directed by said wall upwardly and generally inclined inwardly toward said domelike portions.

4. A combination aquarium ornament stem holder and aerator according to claim 1, said stem support being disposed above said pipe fitting, whereby said support is in non-obstructing relation to the air flowing into said chamber through said fitting.

5. A combination aquarium ornament stem holder and aerator according to claim 1, said pipe fitting extending outwardly from said annular wall, said base being of generally flat configuration and extending outwardly from said annular wall, said base having a recessed portion in underlying and clearing relation to said pipe fitting.

* * * * *